(12) United States Patent
Chou et al.

(10) Patent No.: US 8,878,819 B2
(45) Date of Patent: Nov. 4, 2014

(54) PORTABLE OPTICAL TOUCH SYSTEM AND OPERATING METHOD THEREOF

(75) Inventors: Chia-Te Chou, New Taipei (TW);
Shou-Te Wei, New Taipei (TW);
Chun-Wei Wang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 143 days.

(21) Appl. No.: 13/448,411

(22) Filed: Apr. 17, 2012

(65) Prior Publication Data
US 2013/0141389 A1      Jun. 6, 2013

(30) Foreign Application Priority Data
Dec. 5, 2011   (TW) .............................. 100144725 A

(51) Int. Cl.
*G06F 3/042*   (2006.01)
*G06F 3/041*   (2006.01)

(52) U.S. Cl.
USPC ...... 345/175; 345/173; 178/18.09; 178/19.05

(58) Field of Classification Search
CPC ....................................................... G06F 3/043
USPC ............... 345/156, 173, 175–178; 178/18.09, 178/19.05
See application file for complete search history.

(56) References Cited

U.S. PATENT DOCUMENTS

| 6,335,723 B1 * | 1/2002 | Wood et al. ................... 345/173 |
| 6,335,724 B1 * | 1/2002 | Takekawa et al. ............ 345/173 |
| 2011/0083109 A1 * | 4/2011 | Hildebrandt et al. ......... 715/862 |
| 2011/0291991 A1 | 12/2011 | Lin |

FOREIGN PATENT DOCUMENTS

| TW | M340450 | 9/2008 |
| TW | 201013154 | 4/2010 |
| TW | 201106226 | 2/2011 |

OTHER PUBLICATIONS

Office action mailed on Feb. 19, 2014 for the Taiwan application No. 100144725, filing date: Dec. 5, 2011, p. 1 line 11~14, p. 2-6 and p. 7 line 1~19 Translation.

* cited by examiner

*Primary Examiner* — Lun-Yi Lao
*Assistant Examiner* — Jarurat Suteerawongsa
(74) *Attorney, Agent, or Firm* — Winston Hsu; Scott Margo

(57) ABSTRACT

A portable optical touch system is disclosed in the present invention. The portable optical touch system includes two camera devices movably connected with each other and respectively disposed on two corners of a plane. Each camera device includes an imaging module for capturing an image of an object on the screen, an adjusting module connected to the imaging module for determining whether the two imaging modules are positioned on the same plane, and a measuring module connected to the imaging module for calculating a distance between the two imaging modules. The portable optical touch system further includes a controlling unit electrically connected to the camera device for calculating a coordinates of the object on the plane by analyzing the distance between the imaging modules and the images captured by the imaging modules.

18 Claims, 4 Drawing Sheets

PORTABLE OPTICAL TOUCH SYSTEM AND OPERATING METHOD THEREOF

BACKGROUND OF THE INVENTION

1. Field of the Invention

The present invention relates to an optical touch system, and more particularly, to a portable optical touch system and an operating method thereof.

2. Description of the Prior Art

Generally, a conventional optical touch positioning system utilizes an optical intercept method to detect coordinates of an object on a touch plane. The conventional optical touch positioning system disposes two optical sensors, such as Complementary Metal-Oxide-Semiconductors (CMOS), respectively on a left corner and a right corner of the touch plane on a panel. Heights of the optical sensors are substantially over than the touch plane about 3 mm to 5 mm. The infrared transmitter is disposed on a position adjacent to the optical sensor, and reflection frames are disposed on a left side, a right side and a lower side of the panel. Therefore, infrared rays from the infrared transmitter is distributed above the touch plane uniformly, and is transmitted toward the reflection frames disposed on the left side, the right side and the lower side of the panel. Meanwhile the infrared rays can be reflected back the optical sensors by the reflection frames, so as to establish the optical sensing network over the touch plane.

As an object (a figure of a user or a stylus) is positioned on a position of the touch plane for executing optical touch operation, an optical path of the position is blocked by the object, an intensity of an optical signal detected by the optical sensor is decayed, and the optical sensors disposed on the two corners of the touch plane can calculate the angle of the object according to the decayed intensity of the optical signal, so as to determine coordinates of the object on the touch plane by trigonometric function, and to complete the plane position of the object. However, the conventional optical touch positioning system includes the optical sensors fixed on the panel. The huge-size panel is moved with a movement of the optical touch positioning system, which results inconvenience. Thus, the conventional optical touch positioning system with the fixed-size panel has drawbacks of heavy weight and complicated assembly.

SUMMARY OF THE INVENTION

The present invention provides a portable optical touch system and an operating method thereof for solving above drawbacks.

According to the claimed invention, a portable optical touch system includes a first camera device disposed on a corner of a plane, a second camera device movably connected to the first camera device and disposed on the other corner of the plane, and a controlling unit electrically connected to the first camera device. The first camera device includes a first imaging module for capturing an image of an object on the plane, a first adjusting module connected to the first imaging module, and a first measuring module connected to the first imaging module. The second camera device includes a second imaging module for capturing the image of the object with the first imaging module, a second adjusting module connected to the second imaging module for determine whether the first imaging module and the second imaging module are on the same plane with the first adjusting module, and a second measuring module connected to the second imaging module for calculating a distance between the first imaging module and the second imaging module with the first measuring module. The controlling unit analyzes the distance calculated by the first measuring module and the second measuring module and the image of the object captured by the first imaging module and the second imaging module for calculating a coordinate value of the object on the plane.

According to the claimed invention, the first camera device further comprises a rotary mechanism. The first camera device utilizes the rotary mechanism to adjust a rotary angle of the first imaging module relative to the second imaging module.

According to the claimed invention, the portable optical touch system further includes a recording unit electrically connected to the controlling unit for recording the coordinate value calculated by the controlling unit.

According to the claimed invention, the first camera device further includes a first transmission unit electrically connected to the first imaging module and the controlling unit, and the second camera device further includes a second transmission unit electrically connected to the second imaging module. The controlling unit receives detecting data from the first camera device and the second camera device via the first transmission unit and the second transmission unit, so as to calculate the coordinate value and to transmit the coordinate value to an external host.

According to the claimed invention, the first transmission unit is a wireless transmission unit or a wire transmission unit.

According to the claimed invention, the first adjusting module and the second adjusting module utilize a spinning mechanism to determine whether the first imaging module and the second imaging module are on the same plane.

According to the claimed invention, the first adjusting module and the second adjusting module utilize an assembly of a signal transmitter and a signal receiver to determine whether the first imaging module and the second imaging module are on the same plane.

According to the claimed invention, the first measuring module and the second measuring module utilize a spinning mechanism to measure the distance between the first imaging module and the second imaging module.

According to the claimed invention, the first measuring module and the second measuring module utilize an assembly of a signal transmitter and a signal receiver to measure the distance between the first imaging module and the second imaging module.

According to the claimed invention, the signal transmitter transmits a signal to the signal receiver via acoustic transmission or optical transmission.

According to the claimed invention, an operating method of a portable optical touch system includes disposing a first camera device and a second camera device respectively on two corners of a plane, adjusting a first imaging module of the first camera device on the same plane as a second imaging module of the second camera device, measuring a distance between the first imaging module and the second imaging module, capturing an image of an object on the plane, and analyzing the distance and the image of the object to calculate a coordinate value of the object on the plane.

The portable optical touch system of the present invention includes two separate camera devices. The first camera device can move close the second camera device to decrease the volume of the portable optical touch system for convenience. The first camera device can further move away from the second camera device when installing the portable optical touch system, and the first camera device and the second camera device can be respectively disposed on two corners of the plane. The plane can be a surface of sheet glass, wall or desk. Then the portable optical touch system utilizes the adjusting modules and the rotary mechanisms to adjust the rotary angle between the imaging modules, and transmits the detecting data from the measuring modules via the transmission units, so that the controlling unit can analyze the distance between the separate imaging modules.

When the object is put on the touch area of the plane, the controlling unit can calculate the coordinate value of the object on the plane according to the images captured by the imaging modules and the distance between the imaging modules, so the coordinate value of the object can be generated and further be used for the optical touch operation. Besides, the portable optical touch system of the present invention can further include the recording unit to store the images captured by the imaging modules and the coordinate value calculated by the controlling unit for recording the operation history. Therefore, the portable optical touch system of the present invention has advantages of slight weight and easy assembly. The user can carry and install the portable optical touch system conveniently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
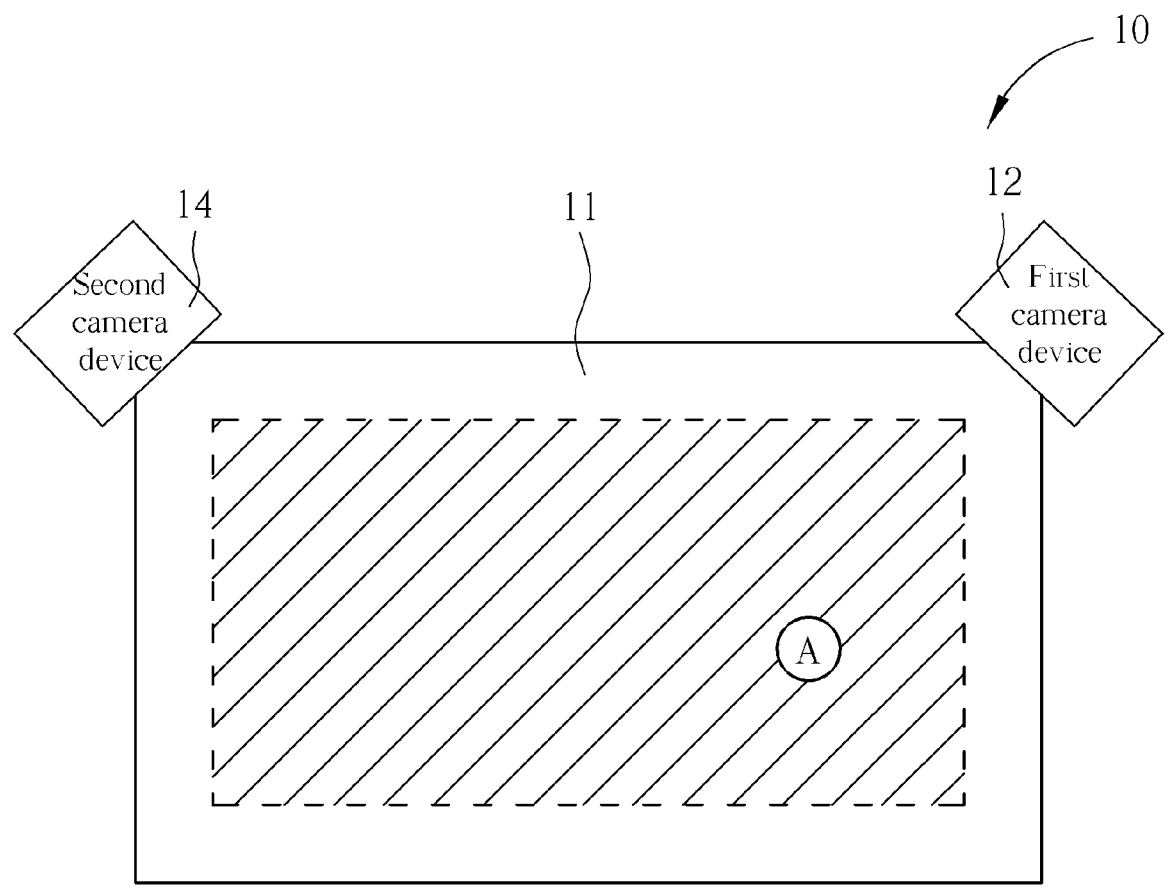
FIG. 1 is a diagram of a portable optical touch system according to an embodiment of the present invention.

Please refer to FIG. 1. FIG. 1 is a diagram of a portable optical touch system 10 according to an embodiment of the present invention. The portable optical touch system 10 includes a first camera device 12 and a second camera device 14. The second camera device 14 can be movably connected to the first camera device 14, and the first camera device 12 and the second camera device 14 are respectively disposed on two corners of a plane 11 for optical touch operation. In the embodiment, the plane 11 can be a surface on a display panel, and the display panel can include components such as a liquid panel, a thin film, a diffusion film, a light guiding plate, a backlight source and so on. The plane 11 can further be a structural component having smooth surface, such as a whiteboard, a piece of glass, a desk or a wall. The related description of the plane 11 is introduced in the prior art, and a detail introduction is omitted herein for simplicity.

The first camera device 12 and the second camera device 14 of the present invention are separate components. When the portable optical touch system 10 is not in use, the first camera device 12 can move close the second camera device 14 to decrease volume of the portable optical touch system 10 for convenience. As installing the portable optical touch system 10, the first camera device 12 and the second camera device 14 can be respectively disposed on a left corner and a right corner of the plane 11 and face a touch area (the diagonal area) on the plane 11, so as to capture an image of an object A within the touch area. Thus, the portable optical touch system 10 can capture and calculate position information of the object A, such as a figure or a stylus, on the touch area of the plane 11 for the optical touch operation. Positions of the first camera device 12 and the second camera device 14 are not limited to the above-mentioned embodiment, and depend on design demand.

Figure 2:
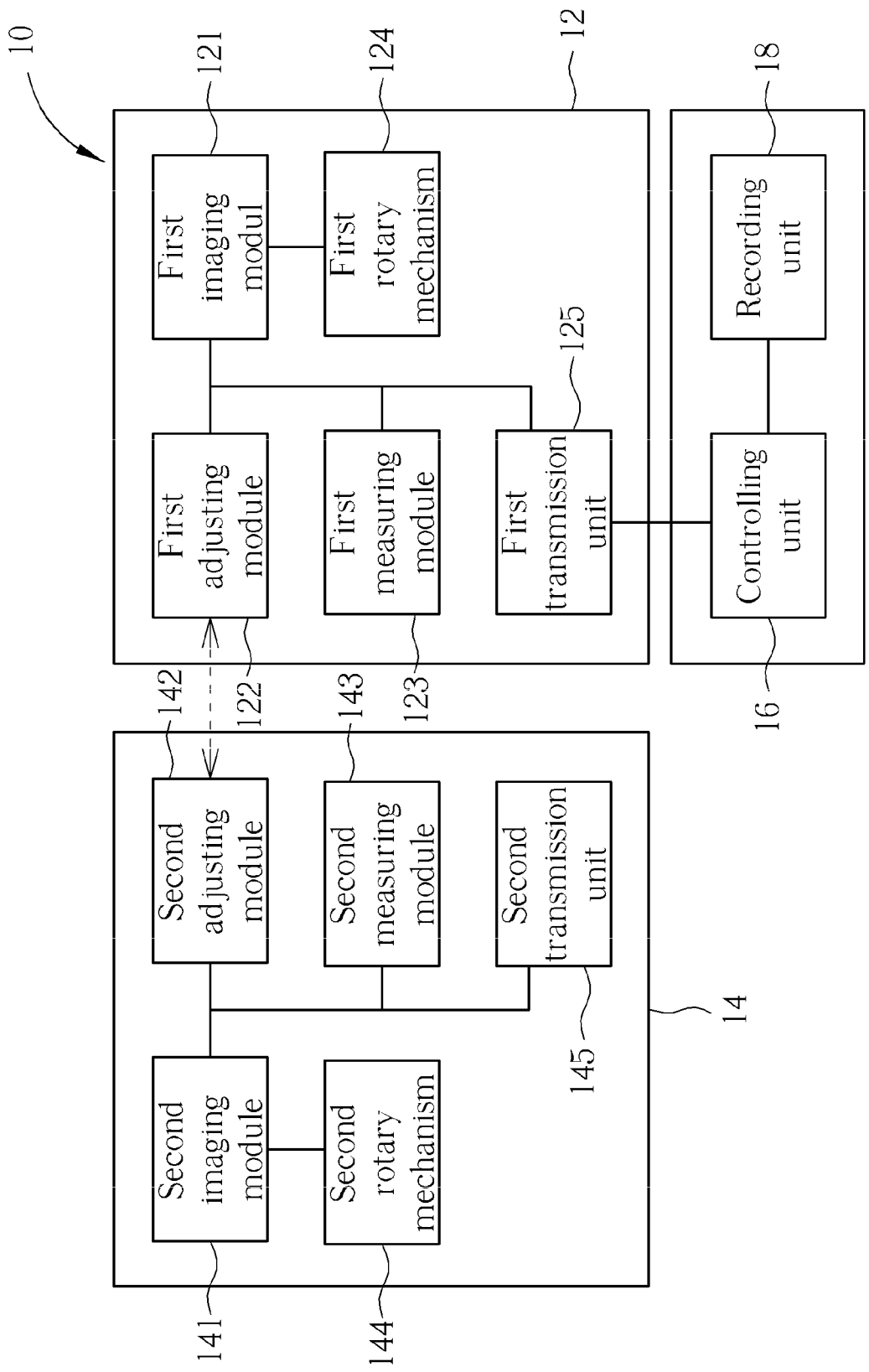
FIG. 2 is functional diagram of the portable optical touch system according to the embodiment of the present invention.

Please refer to FIG. 2. FIG. 2 is functional diagram of the portable optical touch system 10 according to the embodiment of the present invention. The first camera device 12 includes a first imaging module 121, a first adjusting module 122, a first measuring module 123 and a first rotary mechanism 124. The second camera device 14 includes a second imaging module 141, a second adjusting module 142, a second measuring module 143 and a second rotary mechanism 144. The first imaging module 121 and the second imaging module 141 can respectively be video cameras for capturing the image of object A on the plane 11. The first adjusting module 122 and the first measuring module 123 can be respectively connected to the first imaging module 121, and the second adjusting module 142 and the second measuring module 143 can be respectively connected to the second imaging module 141, so as to adjust and measure data between the first imaging module 121 and the second imaging module 141 accurately. The first rotary mechanism 124 and the second rotary mechanism 144 can be respectively disposed on bottoms of the first imaging module 121 and the second imaging module 141 for adjusting rotary angles of the first imaging module 121 relative to the second imaging module 141. The first rotary mechanism 124 and the second rotary mechanism 144 can respectively be viscose mechanisms or revolve mechanisms. Mechanisms capable of rotating the imaging modules to adjust its rotary angle belong to skills of the present invention.

When the portable optical touch system 10 is installed on the plane 11, the first adjusting module 122 and the second adjusting module 142 can determine whether the first imaging module 121 is on the same plane as the second imaging module 141. For example, the first adjusting module 122 can be connected to the second adjusting module 142 via a spinning mechanism with a cable. As the first imaging module 121 moves close the second imaging module 141, the cable can be gathered as a tape by the spinning mechanism automatically, so as to reduce the volume of the portable optical touch system 10. As the first imaging module 121 moves away from the second imaging module 141, the cable can stretch out of the spinning mechanism, and a user can determine whether the first imaging module 121 is on the same plane as the second imaging module 141 by watching a level of the cable. When the first imaging module 121 and the second imaging module 141 are not on the same plane, the rotary angle of the first imaging module 121 (or the second imaging module 141) can be adjusted manually by the first rotary mechanism 124 (or the second rotary mechanism 144), so as to adjust the first imaging module 121 on the same plane as the second imaging module 141.

In addition, the first adjusting module 122 and the second adjusting module 142 can further utilize an assembly of a signal transmitter and a signal receiver to determine whether the first imaging module 121 and the second imaging module 141 are on the same plane. The signal transmitter can transmit a signal to the signal receiver via acoustic transmission or optical transmission, such as the assembly of a laser transmitter and a laser receiver, the assembly of an infrared transmitter and an infrared receiver, the assembly of an acoustic transmitter and an acoustic receiver, and so on. Due to physical property of beams, the signal receiver (the first adjusting module 122) does not receive the signal outputted from the signal transmitter (the second adjusting module 142) when the first image module 121 is not on the same plane as the second imaging module 141. That is to say, a transmission path between the signal receiver and the signal transmitter can not be established as the first image module 121 does not align with the second imaging module 141, which means the signal moves straight out of the signal transmitter can not arrive the lopsided signal receiver, so that the user have to manually rotate the first imaging module 121 or the second imaging module 141 for amendment. After the first image module 121 is on the same plane as the second imaging module 141, the signal receiver can output prompt information, such as an acoustic signal or an optical signal, to show completion of adjusting procedure when the signal receiver receives the signal outputted from the signal transmitter.

As finishing the adjusting procedure of the first imaging module 121 and the second imaging module 141, the first measuring module 123 and the second measuring module 143 can be actuated to measure a distance between the first imaging module 121 and the second imaging module 141. The first measuring module 123 and the second measuring module 143 can utilize the spinning mechanism with the cable, or the assembly of the signal transmitter and the signal receiver to measure the distance between the first imaging module 121 and the second imaging module 141. When the spinning mechanism with the cable is utilized, a length of the cable stretching out of the spinning mechanism corresponds to a dimension of the plane 11 whereon the first camera device 12 and the second camera device 14 are disposed, so as to define a range of the touch area of the portable optical touch system 10. In addition, the first measuring module 123 and the second measuring module 143 can further be the signal transmit/receive assembly, such as the assembly of the laser transmitter and the laser receiver, the assembly of the infrared transmitter and the infrared receiver, and so on, to measure the distance between the first imaging module 121 and the second imaging module 141. The signal transmit/receive assembly can utilize time difference of signal transmission or phase variation to calculate the distance between the imaging modules. Thus, the portable optical touch system 10 had finished the initial setting, and can start the optical touch operation.

Furthermore, the portable optical touch system 10 can further include a controlling unit 16 and a recording unit 18. The controlling unit 16 can be electrically connected to the first camera device 12 for analyzing the distance between the first measuring module 123 and the second measuring module 143 (which means the distance between the first imaging module 121 and the second imaging module 141), and the image of the object A captured by the first imaging module 121 and the second imaging module 141, so as to calculate a coordinate value of the object A on the plane 11. For example, the image captured by the first imaging module 121 and the second imaging module 141 can be analyzed by digital signal processing (DSP), and the position information of the object A can obtain after numerical computation, such as error filtering, triangulation, and coordinate transformation. Then, the controlling unit 16 can compare the position information to the dimension of the touch area, to generate the corresponding coordinate value.

Besides, the recording unit 18 can be electrically connected to the controlling unit 16 for recording the coordinate value calculated by the controlling unit 16, so as to record a history of the optical touch operation of the portable optical touch system 10. The first camera device 12 can further include a first transmission unit 125 electrically connected to the first imaging module 121 and the controlling unit 16, the second camera device 14 can further include a second transmission unit 145 electrically connected to the second imaging module 141. The controlling unit 16 can obtain detecting data, such as the distance between the first imaging module 121 and the second imaging module 141, and the image of the object A captured by the first imaging module 121 and the second imaging module 141, from the first camera device 12 and the second camera device 14 via the first transmission unit 125 and the second transmission unit 145, and then further calculate the coordinate value of the object A on the plane 11 according to the detecting data. Final, the first transmission unit 125 can transmit the coordinate value calculated by the controlling unit 16 to an external host, for driving the external host to execute a corresponding application program.

The recording unit 18 can be a Volatile memory or a non-volatile memory, alternatively. The first transmission unit 125 and the second transmission unit 145 can respectively be a wireless transmission unit, such as wifi or bluetooth, or a wire transmission unit, such as the cable. The portable optical touch system 10 can further include a power supply and a digital level gauge for supplying electric power and detecting a level of the camera devices. The detail descriptions of the power supply and the digital level gauge are omitted herein for simplicity.

Figure 3:
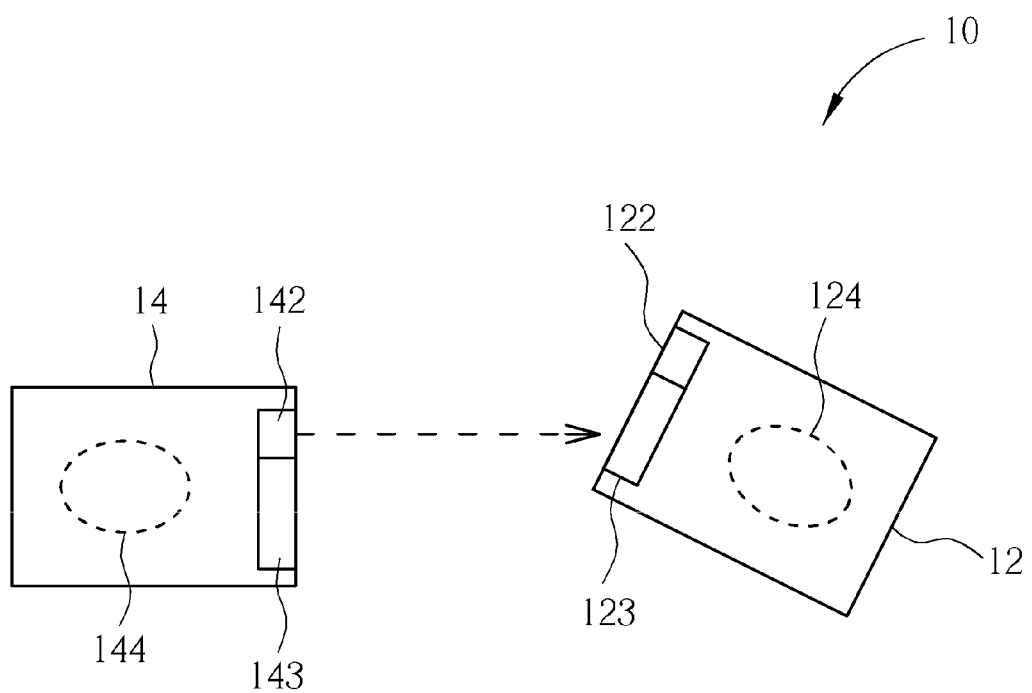
FIG. 3 is a top view of the portable optical touch system according to the embodiment of the present invention.

Please refer to FIG. 3. FIG. 3 is a top view of the portable optical touch system 10 according to the embodiment of the present invention. The adjusting modules shown in FIG. 3 are the assembly of the signal transmitter and the signal receiver in this embodiment. The first adjusting module 122 and the second adjusting module 142 are respectively disposed on two facing lateral surfaces of the first camera device 12 and the second camera device 14. When the first imaging module 121 and the second imaging module 141 are not on the same plane, the first adjusting module 122 (the signal receiver) can not receive the signal outputted from the second adjusting module 142 (the signal transmitter), so that the user can rotate the first camera device 12 via the first rotary mechanism 124, to move the first camera device 12 on the same plane as the second camera device 14. The first measuring module 123 and the second measuring module 143 can be respectively disposed by the first adjusting module 122 and the second adjusting module 142 for measuring the distance between the first imaging module 121 and the second imaging module 141 after level adjustment. It should be mentioned that the adjusting module can be integrated with the measuring module as a verification module. For example, the assembly of the laser transmitter and the laser receiver can detect the level and the distance between the first imaging module 121 and the second imaging module 141 simultaneously, so as to speed the initial setting of the portable optical touch system 10.

Figure 4:
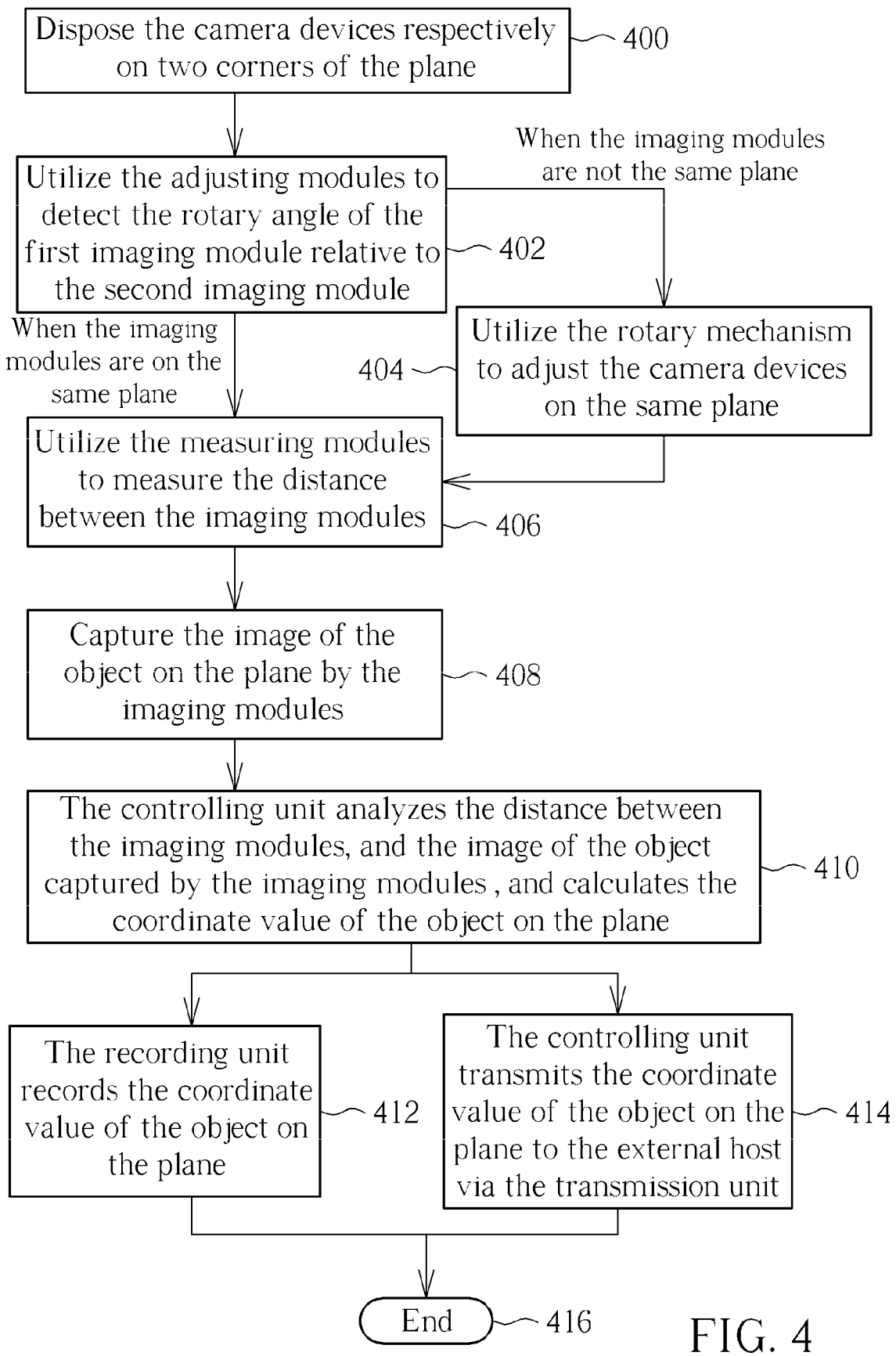
FIG. 4 is a flow chart of an operating method of the portable optical touch system according to the embodiment of the present invention.

Please refer to FIG. 4. FIG. 4 is a flow chart of an operating method of the portable optical touch system 10 according to the embodiment of the present invention. The operating method includes following steps:

Step 400: Dispose the first camera device 12 and the second camera device 14 respectively on two corners of the plane 11, and the first imaging module 121 and the second imaging module 141 respectively face the touch area on the plane 11.

Step 402: Utilize the first adjusting module 122 and the second adjusting module 142 to detect the rotary angle of the first imaging module 121 relative to the second imaging module 141. Execute step 404 when the first imaging module 121 and the second imaging module 141 are not the same plane. Execute step 406 when the first imaging module 121 and the second imaging module 141 are on the same plane.

Step 404: Utilize the first rotary mechanism 124 (or the second rotary mechanism 144) to adjust the first camera device 12 (or the second camera device 14) on the same plane as the second camera device 14 (or the first camera device 12), and execute step 406.

Step 406: Utilize the first measuring module 123 and the second measuring module 143 to measure the distance between the first imaging module 121 and the second imaging module 141.

Step 408: Capture the image of the object A on the plane 11 by the first imaging module 121 and the second imaging module 141.

Step 410: The controlling unit 16 obtains the distance between the first imaging module 121 and the second imaging module 141, and the image of the object A captured by the first imaging module 121 and the second imaging module 141 via the first transmission unit 125 and the second transmission unit 145, then calculates the coordinate value of the object A on the plane 11.

Step 412: The recording unit 18 records the coordinate value of the object A on the plane 11.

Step 414: The controlling unit 16 transmits the coordinate value of the object A on the plane 11 to the external host via the first transmission unit 125.

Step 416: End.

Detail description of the above steps is introduced as following. When installing the portable optical touch system 10, the first camera device 12 can separate away from the second camera device 14, and the first camera device 12 and the second camera device 14 are respectively disposed on two corners of the plane 11. The portable optical touch system 10 has to execute the initial setting before the optical touch operation. First, the user utilizes the first adjusting module 122 and the second adjusting module 142 to determine whether the first imaging module 121 is on the same plane as the second imaging module 141. If not, the rotary angle of the first imaging module 121 relative to the second imaging module 141 can be adjusted by the first rotary mechanism 124 or the second rotary mechanism 144. Applications of the first adjusting module 122 and the second adjusting module 142 can be applied as contact adjusting modules or non-contact adjusting modules, and detail introduction is omitted herein for simplicity.

Because the portable optical touch system 10 of the present invention can be installed on the plane 11 with any dimensions according to user demand, the portable optical touch system 10 starts the first measuring module 123 and the second measuring module 143 to measure the distance between the first imaging module 121 and the second imaging module 141 after the level adjustment, so as to judge the dimensions of the plane 11 whereon the portable optical touch system 10 is disposed, and to define the range of the touch area. Applications of the first measuring module 123 and the second measuring module 143 can be applied as the contact adjusting modules or the non-contact adjusting modules, and detail introduction is omitted herein for simplicity. After the level adjustment and distance measurement, the portable optical touch system 10 can execute the optical touch operation, so the user can mark on the touch area of the plane 11 by the finger or the stylus, and the portable optical touch system 10 can immediately distinguish a moving path of the mark, and store path history (a variation of the coordinate value of the object A on the plane 11) in the recording unit 18 or transmit the moving path to the external host for executing the corresponding application program.

Comparing to the prior art, the portable optical touch system of the present invention includes two separate camera devices. The first camera device can move close the second camera device to decrease the volume of the portable optical touch system for convenience. The first camera device can further move away from the second camera device when installing the portable optical touch system, and the first camera device and the second camera device can be respectively disposed on two corners of the plane. The plane can be a surface of sheet glass, wall or desk. Then the portable optical touch system utilizes the adjusting modules and the rotary mechanisms to adjust the rotary angle between the imaging modules, and transmits the detecting data from the measuring modules via the transmission units, so that the controlling unit can analyze the distance between the separate imaging modules.

When the object is put on the touch area of the plane, the controlling unit can calculate the coordinate value of the object on the plane according to the images captured by the imaging modules and the distance between the imaging modules, so the coordinate value of the object can be generated and further be used for the optical touch operation. Besides, the portable optical touch system of the present invention can further include the recording unit to store the images captured by the imaging modules and the coordinate value calculated by the controlling unit for recording the operation history. Therefore, the portable optical touch system of the present invention has advantages of slight weight and easy assembly. The user can carry and install the portable optical touch system conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable optical touch system comprising:
a first camera device disposed on a corner of a plane, the first camera device comprising:
 a first imaging module for capturing an image of an object on the plane;
 a first adjusting module connected to the first imaging module;
 a first measuring module connected to the first imaging module; and
 a rotary mechanism whereon the first imaging module is disposed;
a second camera device movably connected to the first camera device and disposed on the other corner of the plane, the second camera device comprising:
 a second imaging module for capturing the image of the object with the first imaging module;
 a second adjusting module connected to the second imaging module for determining whether the first imaging module and the second imaging module are on the same plane with the first adjusting module; and
 a second measuring module connected to the second imaging module to measure a distance between the first imaging module and the second imaging module with the first measuring module; and
a controlling unit electrically connected to the first camera device, the controlling unit being adapted to drive the rotary mechanism to adjust a rotary angle of the first imaging module relative to the second imaging module according to a result of the first adjusting module and the second adjusting module determining whether the first imaging module and the second imaging module are on the same plane, to measure the distance since the first imaging module and the second imaging module are on the same plane, and to analyze the distance calculated by the first measuring module and the second measuring module and the image of the object captured by the first imaging module and the second imaging module for calculating a coordinate value of the object on the plane.

2. The portable optical touch system of claim 1, further comprising:
a recording unit electrically connected to the controlling unit for recording the coordinate value calculated by the controlling unit.

3. The portable optical touch system of claim 1, wherein the first camera device further comprises a first transmission unit electrically connected to the first imaging module and the controlling unit, the second camera device further comprises a second transmission unit electrically connected to the second imaging module, the controlling unit receives detecting data from the first camera device and the second camera device via the first transmission unit and the second transmission unit, so as to calculate the coordinate value and to transmit the coordinate value to an external host.

4. The portable optical touch system of claim 3, wherein the first transmission unit is a wireless transmission unit or a wire transmission unit.

5. The portable optical touch system of claim 1, wherein the first adjusting module and the second adjusting module utilize a spinning mechanism to determine whether the first imaging module and the second imaging module are on the same plane.

6. The portable optical touch system of claim 1, wherein the first adjusting module and the second adjusting module utilize an assembly of a signal transmitter and a signal receiver to determine whether the first imaging module and the second imaging module are on the same plane.

7. The portable optical touch system of claim 6, wherein the signal transmitter transmits a signal to the signal receiver via acoustic transmission or optical transmission.

8. The portable optical touch system of claim 1, wherein the first measuring module and the second measuring module utilize a spinning mechanism to measure the distance between the first imaging module and the second imaging module.

9. The portable optical touch system of claim 1, wherein the first measuring module and the second measuring module utilize an assembly of a signal transmitter and a signal receiver to measure the distance between the first imaging module and the second imaging module.

10. The portable optical touch system of claim 9, wherein the signal transmitter transmits a signal to the signal receiver via acoustic transmission or optical transmission.

11. An operating method of a portable optical touch system comprising:
disposing a first camera device and a second camera device respectively on two corners of a plane;
adjusting a first imaging module of the first camera device on the same plane as a second imaging module of the second camera device;
utilizing a first adjusting module and a second adjusting module to determine whether the first imagine module and the second imaging module are on the same plane;
driving a rotary mechanism, whereon the first imaging module is disposed, with a control unit to adjust a rotary angle of the first imaging module relative to the second imaging module according to a result of the first adjusting module and the second adjusting module determining whether the first imaging module and the second imaging module are on the same plane;
measuring a distance between the first imaging module and the second imaging module since the first imaging module and the second imaging module are on the same plane;
capturing an image of an object on the plane; and
analyzing the distance and the image of the object to calculate a coordinate value of the object on the plane.

12. The operating method of claim 11, further comprising:
recording the coordinate value of the object on the plane.

13. The operating method of claim 11, further comprising:
transmit the coordinate value of the object on the plane to an external host.

14. The operating method of claim 13, wherein transmit the coordinate value of the object on the plane to the external host comprises:
utilizing a transmission unit to transmit the coordinate value of the object on the plane to the external host.

15. The operating method of claim 11, wherein the operating method further comprises:
adjusting the rotary angle of the first imaging module relative to the second imaging module when the first camera device and the second camera device are not on the same plane.

16. The operating method of claim 11, wherein measuring the distance between the first imaging module and the second imaging module comprises:
utilizing a first measuring module and a second measuring module to measure the distance between the first imaging module and the second imaging module.

17. The operating method of claim 11, wherein the first adjusting module and the second adjusting module are a spinning mechanism or an assembly of a signal transmitter and a signal receiver.

18. The operating method of claim 16, wherein the first measuring module and the second measuring module are a spinning mechanism or an assembly of a signal transmitter and a signal receiver.

* * * * *